(12) United States Patent
Song et al.

(10) Patent No.: US 9,888,248 B2
(45) Date of Patent: *Feb. 6, 2018

(54) METHOD AND APPARATUS FOR GENERATING ENCODED MOTION INFORMATION /RECOVERING MOTION INFORMATION USING MOTION INFORMATION INTEGRATION, AND IMAGE ENCODING/DECODING METHOD AND APPARATUS USING SAME

(71) Applicant: SK TELECOM CO., LTD., Seoul (KR)

(72) Inventors: Jinhan Song, Seoul (KR); Jeongyeon Lim, Seongnam Si (KR); Haekwang Kim, Seoul (KR); Joohee Moon, Seoul (KR); Yunglyul Lee, Seoul (KR); Jongki Han, Seoul (KR); Byeungwoo Jeon, Seongnam-si (KR)

(73) Assignee: SK TELECOM CO., LTD., Seoul (KR)

(*) Notice: Subject to any disclaimer, the term of this patent is extended or adjusted under 35 U.S.C. 154(b) by 10 days.

This patent is subject to a terminal disclaimer.

(21) Appl. No.: 14/937,277

(22) Filed: Nov. 10, 2015

(65) Prior Publication Data

US 2016/0065972 A1    Mar. 3, 2016

Related U.S. Application Data

(63) Continuation of application No. 13/914,910, filed on Jun. 11, 2013, now Pat. No. 9,270,996, which is a (Continued)

(30) Foreign Application Priority Data

Dec. 15, 2010   (KR) .................. 10-2010-0127985

(51) Int. Cl.
| | |
|---|---|
| H04N 7/12 | (2006.01) |
| H04N 19/176 | (2014.01) |
| H04N 19/52 | (2014.01) |
| H04N 19/615 | (2014.01) |
| H04N 19/124 | (2014.01) |
| H04N 19/44 | (2014.01) |
| H04N 19/513 | (2014.01) |
| H04N 19/61 | (2014.01) |
| H04N 19/503 | (2014.01) |

(52) U.S. Cl.
CPC ......... *H04N 19/176* (2014.11); *H04N 19/124* (2014.11); *H04N 19/44* (2014.11);
(Continued)

(58) Field of Classification Search
CPC .......................... H04N 19/139; H04N 19/513
See application file for complete search history.

(56) References Cited

U.S. PATENT DOCUMENTS

| | | |
|---|---|---|
| 5,608,458 A | 3/1997 | Chen et al. |
| 2005/0141614 A1 | 6/2005 | Braspenning et al. |

(Continued)

FOREIGN PATENT DOCUMENTS

| | | |
|---|---|---|
| CN | 101472174 A | 7/2009 |
| KR | 1019970004896 A | 1/1997 |

(Continued)

OTHER PUBLICATIONS

International Search Report dated Aug. 1, 2012 for PCT/KR2011/009673.

(Continued)

*Primary Examiner* — Young Lee
(74) *Attorney, Agent, or Firm* — Hauptman Ham, LLP

(57) ABSTRACT

An apparatus for decoding a current block includes: a decoding unit to extract a first identification information from a bitstream, and reconstruct a quantized frequency residual block of the current block from the bitstream; a dequantization and inverse transform unit to dequantize and inversely transform the quantized frequency residual block to reconstruct a residual block of the current block; an inter prediction unit to generate the plurality of motion vector candidates of the current block from neighboring blocks of the current blocks, select a motion vector candidate from the plurality of motion vector candidates based on a second identification information, the second identification information being decoded from the bitstream, reconstruct the motion vector of the current block as the selected motion vector candidate, and generate a predicted block of the current block by using the reconstructed motion vector of the current block.

1 Claim, 7 Drawing Sheets

Related U.S. Application Data continuation of application No. PCT/KR2011/009673, filed on Dec. 15, 2011.

(52) U.S. Cl.
CPC .......... *H04N 19/513* (2014.11); *H04N 19/52* (2014.11); *H04N 19/61* (2014.11); *H04N 19/615* (2014.11); *H04N 19/503* (2014.11)

(56) References Cited

U.S. PATENT DOCUMENTS

| | | |
|---|---|---|
| 2006/0017843 A1 | 1/2006 | Shi et al. |
| 2006/0251330 A1 | 11/2006 | Toth et al. |
| 2008/0126278 A1 | 5/2008 | Bronstein et al. |
| 2008/0165852 A1 | 7/2008 | Zhang |
| 2008/0165855 A1 | 7/2008 | Wang et al. |
| 2009/0210857 A1 | 8/2009 | Martineau |
| 2010/0054585 A1 | 3/2010 | Guillou et al. |
| 2010/0135387 A1 | 6/2010 | Escoda et al. |
| 2010/0239019 A1 | 9/2010 | Bock et al. |
| 2010/0322314 A1 | 12/2010 | Huang et al. |
| 2011/0129015 A1 | 6/2011 | Nguyen et al. |
| 2011/0170608 A1 | 7/2011 | Shi et al. |

FOREIGN PATENT DOCUMENTS

| | | |
|---|---|---|
| KR | 1020010000248 A | 1/2001 |
| KR | 100381061 B1 | 8/2003 |
| KR | 1020050052130 A | 6/2005 |

METHOD AND APPARATUS FOR GENERATING ENCODED MOTION INFORMATION /RECOVERING MOTION INFORMATION USING MOTION INFORMATION INTEGRATION, AND IMAGE ENCODING/DECODING METHOD AND APPARATUS USING SAME

CROSS-REFERENCE TO RELATED APPLICATIONS

The present application is a continuation of U.S. patent application Ser. No. 13/914,910, filed on Jun. 11, 2013, which is a Continuation of International Patent Application No. PCT/KR2011/009673, filed on Dec. 15, 2011, which is based on and claims the benefit of priority to Korean Patent Application No. 10-2010-0127985, filed on Dec. 15, 2010. The disclosures of the above-listed applications are hereby incorporated by reference herein in their entirety.

FIELD

The present disclosure relates to a method for generating coded motion information before reconstructing by using motion information merge, and video encoding apparatus and a video decoding apparatus for encoding and decoding images by using the same.

BACKGROUND

The statements in this section merely provide background information related to the present disclosure and may not constitute prior art.

Moving Picture Experts Group (MPEG) and Video Coding Experts Group (VCEG) have developed H.264 AVC (Advanced Video Coding), the video compression standard superior to the existing MPEG-4 Part 2 and H.263 standards, and have developed HEVC (High Efficiency Video Coding) in earnest since 2010. In a similar manner to the existing video compression technology, Test Model under Consideration (TMuC) divides an image into blocks and performs entropy encoding by frequency-transforming and quantizing a residual block by motion estimation or intra prediction. The TMuC of the HEVC performs motion estimation by using multiple reference frames, encodes reference frame indexes and motion vectors as motion information, and outputs a bitstream.

The inventor(s), therefore, has noted that there is a need for a video encoding and decoding method that can efficiently encode and decode the motion information by deciding whether to encode the motion information by merging, based on pre-encoded information, when performing encoding by merging the motion information.

SUMMARY

In accordance with some embodiments, a video encoding apparatus comprises a decoding unit, a dequantization and inverse transform unit, an inter prediction unit and an addition unit. The decoding unit is configured to extract a first identification information from a bitstream, wherein the first identification information indicates whether a motion vector of the current block is set as one of a plurality of motion vector candidates, and reconstruct a quantized frequency residual block of the current block from the bitstream. The dequantization and inverse transform unit is configured to dequantize and inversely transform the quantized frequency residual block to reconstruct a residual block of the current block. The inter prediction unit is configured to, in response to the first identification information indicating that the motion vector of the current block is set as one of the plurality of motion vector candidates, generate the plurality of motion vector candidates of the current block from neighboring blocks of the current blocks, select a motion vector candidate from the plurality of motion vector candidates based on a second identification information, the second identification information being decoded from the bitstream, reconstruct the motion vector of the current block as the selected motion vector candidate, and generate a predicted block of the current block by using the reconstructed motion vector of the current block. And the addition unit is configured to add the predicted block to the residual block so as to reconstruct the current block.

DETAILED DESCRIPTION

The present disclosure improves video compression efficiency by deciding whether to encode motion information by merge, based on pre-encoded information, when encoding by merging the motion information, thereby reducing the encoding of a merge-related flag and efficiently encoding the motion information.

Hereinafter, a video encoding apparatus and a video decoding apparatus described below may be user terminals such as a personal computer (PC), a notebook computer, personal digital assistant (PDA), portable multimedia player (PMP), PlayStation Portable (PSP), wireless communication terminal, smart phone, TV and the like, or server terminals such as an application server, service server and the like, and may refer to various apparatuses including a communication apparatus such as a communication modem and the like for performing communication with various types of devices or a wired/wireless communication network, memory for storing various types of programs and data for encoding or decoding a video, or performing an inter or intra prediction for the encoding or decoding, and a microprocessor and the like for executing the program to perform an operation and control.

Further, a video encoded into a bitstream (encoded data) by the video encoding apparatus may be transmitted in real time or non-real-time to the video decoding apparatus through wired/wireless communication networks such as the Internet, wireless personal area network (WPAN), wireless local area network (WLAN), WiBro (wireless broadband, aka WiMax) network, mobile communication network and the like or through various communication interfaces such as a cable, a universal serial bus (USB) and the like, and thus decoded in the video decoding apparatus and reconstructed and reproduced as the video.

A video typically may include a series of pictures each of which is divided into predetermined areas, such as frames or blocks. When the area of the video is partitioned into blocks, the partitioned blocks may be classified into an intra block or an inter block depending on an encoding method. The intra block means a block that is encoded through an intra prediction coding method which generates a predicted block by predicting a pixel of a current block using pixels of a reconstructed block that underwent previous encoding and decoding and then encodes a differential value between the predicted block and the pixel of the current block within a current picture where the current encoding is performed. The inter block means a block that is encoded through an inter prediction encoding which generates the predicted block by predicting the current block in the current picture through referencing one or more past pictures or future pictures and then encoding the differential value of the predicted block from the current block. Here, the picture that is referenced in encoding or decoding the current picture is called a reference picture.

Figure 1:
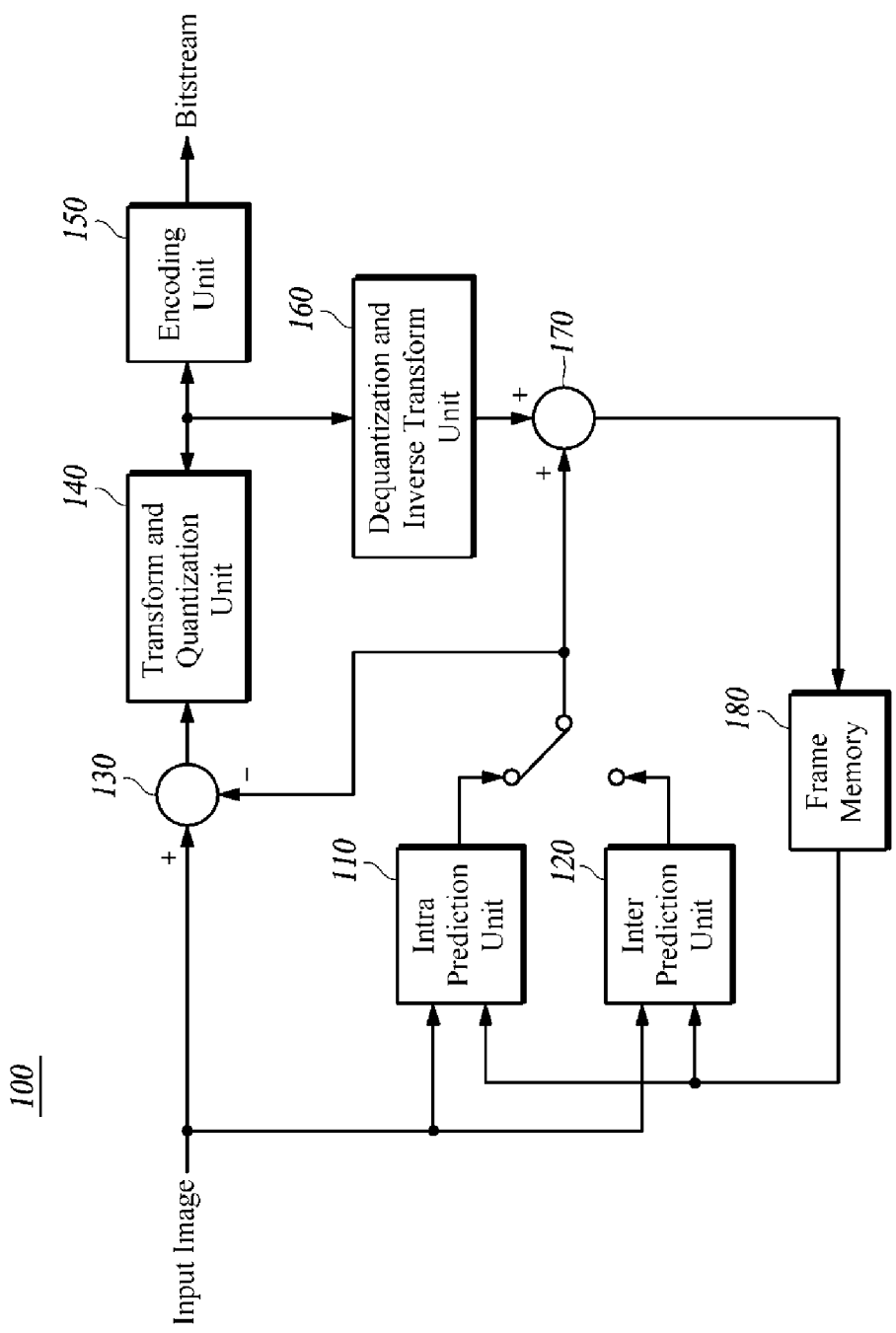
FIG. 1 is a schematic block diagram of a configuration of a video encoding apparatus according to one or more embodiments of the present disclosure.

FIG. 1 is a block diagram schematically showing a configuration of a video encoding apparatus according to at least one embodiment of the present disclosure.

The video encoding apparatus 100 according to one or more embodiments of the present disclosure may include an intra prediction unit 110, an inter prediction unit 120, a subtraction unit 130, a transform and quantization unit 140, an encoding unit 150, an inverse quantization/inverse transform unit 160, an addition unit 170, and a frame memory 180. Other components of the video encoding apparatus 100, such as the intra prediction unit 110, the inter prediction unit 120, the transform and quantization unit 140, the encoding unit 150, and the inverse quantization/inverse transform unit 160 are implemented by one or more processors and/or application-specific integrated circuits (ASICs).

An input image to be encoded is input on the basis of coding block unit. In the present disclosure, the coding block has an M×N form, where M and N may be equal to or different from each other. In addition, the coding block may be divided into variously sized prediction unit blocks.

The intra prediction unit 110 generates a prediction block by using one or more adjacent pixels so as to predict a current prediction unit block. That is, the intra prediction unit 110 generates a prediction block according to a mode of the intra prediction unit 110 by using one or more adjacent pixels of a current block previously reconstructed through an encoding process.

The inter prediction unit 120 generates a prediction block by using a reference frame so as to predict the current prediction unit block. That is, the inter prediction unit 120 generates motion information including a motion vector, a reference frame index, and a motion vector resolution through motion estimation according to the mode of the inter prediction unit 120 in a previous frame previously reconstructed through an encoding process, and generates a prediction block in a motion compensation process by using the motion information. In addition, the inter prediction unit 120 decides whether to encode the motion information by merging, based on pre-encoded information. When it is decided not to encode the motion information by merging, coded motion information including motion information is generated by using a known method. When it is decided to encode the motion information by merging, coded motion information including a merge flag and a merge direction flag, or a merge flag and motion information is generated by using a known merging method.

Figure 2:
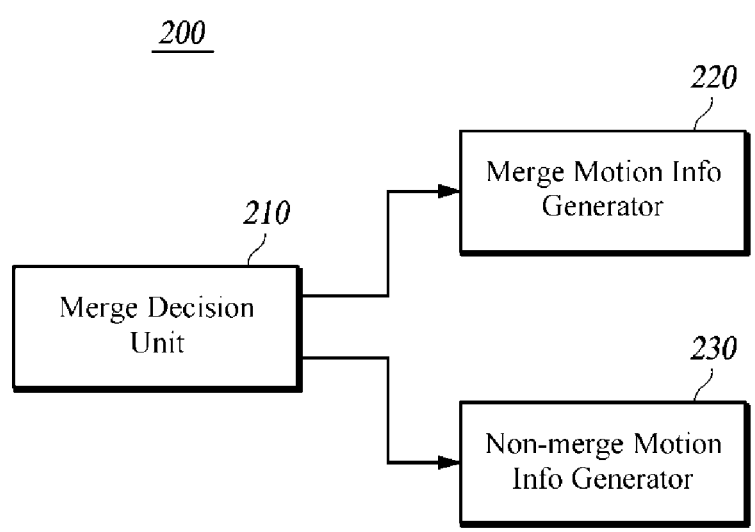
FIG. 2 is a schematic block diagram of a configuration of a coded motion information generating apparatus according to one or more embodiments of the present disclosure.

The inter prediction unit 120 may include a coded motion information generation unit (not shown), and the coded motion information generation unit may be implemented by an individual hardware or software module and may be configured with a coded motion information generating apparatus 200 as shown in FIG. 2. The operation of the coded motion information generation unit will be described below in detail with reference to FIG. 2.

The subtraction unit 130 generates a residual block by subtracting the prediction block from the current block. That is, the subtraction unit 130 generates a residual block by subtracting a pixel value of the prediction block generated by the intra prediction unit 110 or the inter prediction unit 120 from a pixel value of the current block.

The transform and quantization unit 140 generates a quantized frequency residual block in such a manner that it transforms the residual block generated by the subtraction unit 130 into a frequency coefficient, and quantizes the transformed residual block. That is, the transform and quantization unit 140 generates the residual block having a residual coefficient of the residual block generated by the subtraction unit 130 as the frequency coefficient, and quantizes the residual block of the frequency coefficient. As the transform method used herein, a method for transforming an image signal of a spatial domain, such as Hadamard Transform or Discrete Cosine Transform Based Integer Transform, may be used. As the quantization method, various quantization methods, including Dead Zone Uniform Threshold Quantization (hereinafter, referred to as "DZUTQ") or Quantization Weighted Matrix, may be used.

The encoding unit 150 may generate encoded data (bitstream) by encoding the residual block transformed and quantized by the transform and quantization unit 140. As the encoding technique, an entropy encoding technique may be used. However, the present disclosure is not limited thereto, and various encoding techniques may also be used.

In addition, the encoding unit 150 may include not only a bitstream resulting from the encoding of quantization frequency coefficients but also various pieces of information necessary for decoding the encoded frequency coefficient bitstream in the encoded data. That is, the encoded data may include a first field including a bitstream where coded block pattern (CBP), delta quantization parameter, and quantization frequency coefficient are encoded, and a second field including a bit for information necessary for prediction (for example, intra prediction mode in the case of the intra prediction or motion information in the case of the inter prediction).

The dequantization and inverse transform unit 160 generates the residual block by dequantizing and inversely transforming the residual block transformed and quantized by the transform and quantization unit 140. The inverse quantization and inverse transform may be achieved by inversely performing the transform and quantization process of the transform and quantization unit 140. That is, the dequantization and inverse transform unit 160 may generate the residual block with the residual coefficients by dequantizing the quantized block transferred from the transform and quantization unit 140 and inversely transforming the dequantized frequency block.

The addition unit 170 generates a reconstructed block by adding the prediction block generated by the intra prediction unit 110 or the inter prediction unit 120 to the residual block generated by the dequantization and inverse transform unit 160.

The frame memory 180 stores the reconstructed block generated by the addition unit 170, and the stored reconstructed block is used as a reference block for generating the prediction block in the process of the intra prediction or the inter prediction.

FIG. 2 is a block diagram schematically showing a configuration of a coded motion information generating apparatus according to one or more embodiments of the present disclosure. The coded motion information generating apparatus 200 decides whether to encode the motion information by merging, based on the pre-encoded information. When it is decided not to encode the motion information by merging, coded motion information is generated by using a conventional method. When it is decided to encode the motion information by merging, coded motion information is generated by merging. The inter prediction unit 120 of FIG. 1 may include the coded motion information generating apparatus 200.

Referring to FIG. 2, the coded motion information generating apparatus 200 according to one or more embodiments of the present disclosure includes a merge decision unit 210, a merge motion information generator 220, and a non-merge motion information generator 230. The merge decision unit 210 decides whether to encode the motion information by merging, based on the pre-encoded information. In a case where the merge decision unit 210 decides to encode the motion information by merging, the merge motion information generator 220 generates the coded motion information by merging. In a case where the merge decision unit 210 decides not to encode the motion information by merging, the non-merge motion information generator 230 generates the coded motion information without merging. Other components of the coded motion information generating apparatus 200, such as the merge decision unit 210, the merge motion information generator 220 an the non-merge motion information generator 230 are implemented by one or more processors and/or application-specific integrated circuits (ASICs).

Figure 3:
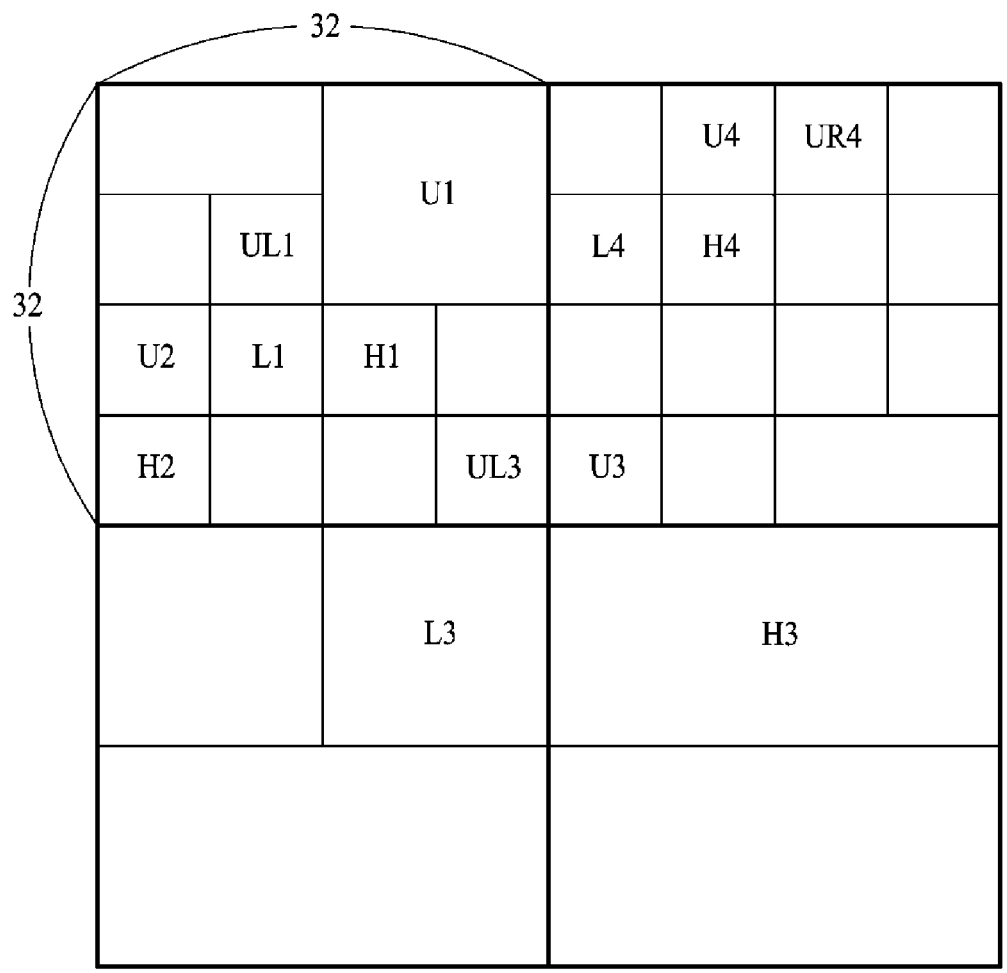
FIG. 3 is an exemplary diagram of pre-encoded image blocks (Ln, Un, ULn, URn) which are usable for generating at least one merge candidate block according to at least one embodiment of the present disclosure.

FIG. 3 is a diagram showing an example of a current block Hn and pre-encoded adjacent image blocks Ln, Un, ULn and URn usable for encoding motion information of the current block Hn. Herein, n is a symbol for identifying the current block and the adjacent image blocks.

In FIG. 3, Hn represents the current block, the motion information of which is to be encoded, Ln represents a left neighboring block including a left sample of the upper leftmost sample of the current block Hn, and Un represents an upper neighboring block including an upper sample of the leftmost sample of the current block Hn. ULn represents a left upper neighboring block including a sample located just above a left sample of the upper leftmost sample of the current block Hn, and URn represents a right upper neighboring block including a sample located on the right side just above the upper rightmost sample of the current block Hn.

FIG. 3 shows an example in which one image is divided into four 32×32 code blocks, each of which is divided into variously sized prediction unit blocks. According to one or more embodiments of the present disclosure, the merge-decision block (which helps to decide whether to merge a current block MV with the MV of one of the merge candidate block) may include one or more neighboring blocks. A set of motion information of a merge-decision block composed of motion information of neighboring blocks may include motion information of one or more neighboring blocks. In at least one embodiment, a set of the motion information of the merge-decision block may include a motion information set of various neighboring blocks. For example, a set of the motion information of the merge-decision block may include motion information MV_Ln and MV_Un of two neighboring blocks Ln and Un, or may include motion information of Ln, Un, ULn and URn. The motion information may include a reference index, a motion vector, and a motion vector resolution.

The merge decision unit 210 decides whether to generate coded motion information of the current block to be encoded in the merge motion information generator 220, or whether to generate coded motion information of the current block to be encoded in the non-merge motion information generator 230, based on whether all pieces of motion information of the merge-decision blocks, composed of the motion information of the neighboring blocks, are similar to one another. When the merge decision unit 210 decides that there is almost no possibility of encoding the motion information by merging based on the pre-encoded information of the neighboring blocks and the motion information of the current block, the coded motion information generating apparatus 200 generates coded motion information to be encoded in the non-merge motion information generator 230, without passing through the merge motion information generator 220. Therefore, the encoding of the merge flag information is reduced to improve compression efficiency.

Figure 4:
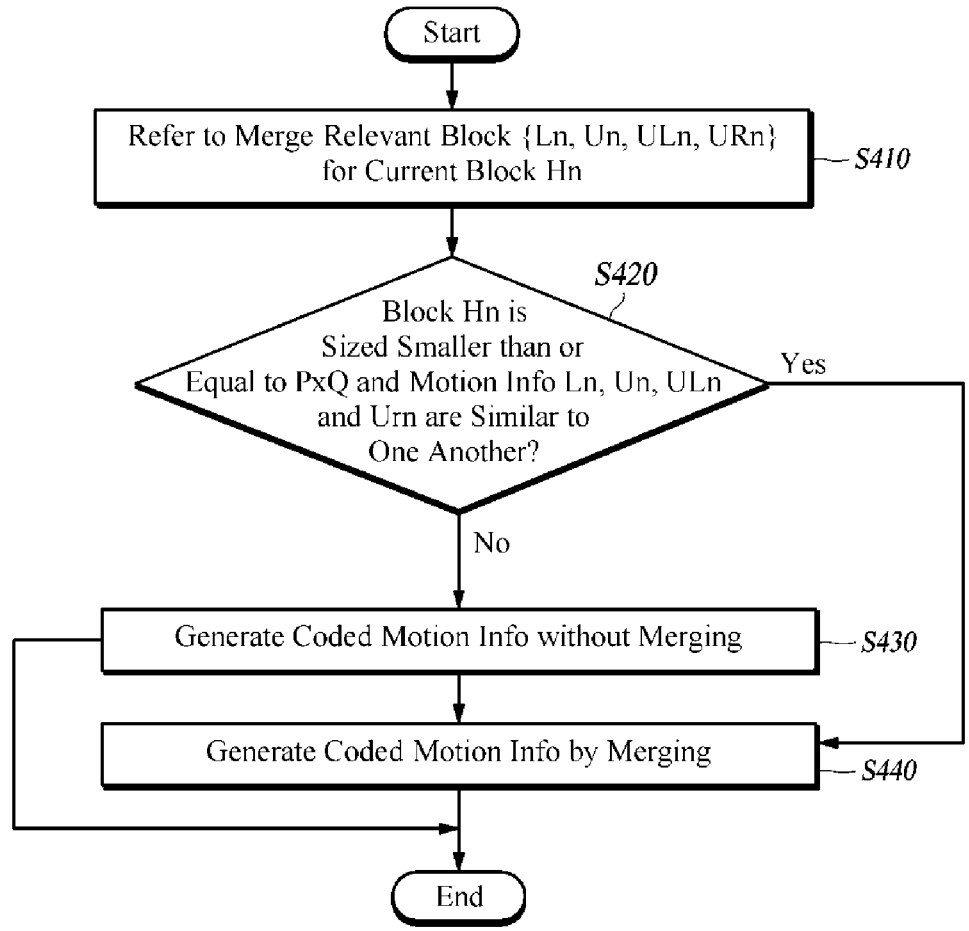
FIG. 4 is an exemplary flowchart of a coded motion information generating method according to one or more embodiments of the present disclosure.

FIG. 4 exemplarily shows a flow diagram of a coded motion information generating method according to one or more embodiments of the present disclosure. Specifically, FIG. 4 exemplarily shows a flow diagram of determining whether to calculate the coded motion information of the current block to be encoded in the merge motion information generator 220 or in the non-merge motion information generator 230, based on whether all pieces of motion information of the merge-decision block composed of the motion information of the neighboring blocks are similar to one another.

In an image, an area where motion is very complex is divided into small blocks, and it is highly likely that pieces of the motion information such as the motion vectors of neighboring blocks are not similar to one another. Under this condition, the motion information of the current block is not merged into the motion information of the neighboring blocks. In addition, in a case where the motion information of the current block is merged into Ln or Un before encoding, if the motion information of Ln is different from the motion information of Un, at least two pieces of information (merge flag and merge direction flag) may be encoded. The merge direction flag refers to information representing a direction of a block having identical motion information with motion information of Hn (i.e., Current block). For the information representing the direction, Ln may be allocated with 1 bit, such as "0", and Un may be allocated with 1 bit, such as "1".

The merge decision unit 210 may refer to a motion information set of a neighboring block set (for example, {Ln, Un, ULn, URn}) as merge-decision block's motion information for a current block (S410). The neighboring block set referred to by the merge decision unit 210 may be configured in various methods, for example, {Ln, Un}, {Ln, Un, ULn}, or {Ln, Un, URn}, and the present disclosure is not limited thereto. In addition, the merge decision unit 210 may decide whether to encode the motion information by merging, by additionally deciding whether the current block is sized larger than a predetermined size. That is, the merge decision unit 210 determines a condition as to whether the current block Hn is sized smaller than or equal to a predetermined size PXQ (for example, 4×4 or 8×8), or all pieces of the motion information of the neighboring block set {Ln, Un, ULn, URn} are similar to one another (S420). If not satisfying the condition, it is determined that the corresponding area is an area where the motions of the current block and/or the neighboring blocks are very complex, and thus, the coded motion information is generated without merging (S430). If the current block Hn is sized larger than the predetermined size PXQ (for example, 4×4 or 8×8) and all pieces of the motion information of the neighboring block set {Ln, Un, ULn, URn} included in the merge-decision blocks are similar to one another, the coded motion information is generated by merging (S440). It is determined that the motion information of the neighboring block encoded in the intra mode is different from the motion information of other neighboring blocks. The determination as to whether the merge-decision block's motion information items have similarity may be made by determining similarity or non-similarity between their motion vectors, which are contained in the motion information. In this case, the determination as to whether the motion vectors are similar may be made by determining whether distances between the motion vectors of the neighboring blocks included in the group of merge-decision blocks are smaller than predetermined threshold value information. At this time, the distance between the motion vectors may use a two-dimensional Euclidean distance or a city-block distance. In addition, the determination as to whether the pieces of the motion information are similar to one another may be made by using a part of information among the pieces of the motion information, for example, by using only the motion vector. In addition, the determination as to whether the pieces of the motion information are similar to one another may be made by additionally determining whether the reference frames of the motion information are equal to one another. That is, when the reference frames as well as the motion vectors are equal to one another, it can be determined that the pieces of the motion information are similar to one another.

The merge motion information generator 220 and the non-merge motion information generator 230 according to at least one embodiment of the present disclosure may follow the TMUC of HEVC of the Joint Collaborative Team for Video Coding Committee (JCT-VC).

The merge motion information generator 220 may generate coded motion information including a merge flag and/or a merge direction flag, based on motion information of merge candidate blocks in which reference index information representing the reference frame and the motion information of the current block including the motion vector and the motion vector resolution are configured with pieces of motion information of pre-encoded adjacent image blocks.

For example, in a case where the merge candidate blocks are {Ln, Un}, the merge motion information generator 220 receives the motion information of the current block Hn and the merge candidate block set including {Ln, Un}, sets the merge flag information as "unmerged" when the motion information of the current block Hn is non-identical with any pieces of the motion information among the pieces of the motion information of the merge candidate blocks {Ln, Un}, and sets the merge flag information "merged" when the motion information of the current block Hn is identical with any one of the pieces of the motion information of the merge candidate blocks {Ln, Un}. When the merge flag represents "merged", the merge direction flag is set to represent the block whose motion information is identical with the motion information of the current block among the pieces of the motion information of the merge candidate blocks {Ln, Un}, and generates the coded motion information including the merge flag and the merge direction flag. In addition, when a part of motion information set (i.e., a set of the pieces motion information) of the merge candidate blocks is non-identical with the motion information of the current block, the coded motion information generated by merging comprises a merge flag representing "merged" and a merge direction flag representing a direction of a block having identical motion information with the motion information of the current block among the merge candidate blocks. Even though the merge flag information is "merged", when all pieces of the motion information of the merge candidate blocks {Ln, Un} are equal to one another, the merge direction flag is not included in the coded motion information. In addition, in a case where all pieces of the motion information among the motion information set of the merge candidate blocks are non-identical with the motion information of the current block, the coded motion information generated by merging includes the merge flag representing "unmerged" and the motion information of the current block. When the merge flag represents "unmerged", the merge motion information generator 220 generates the motion information, including one or more of the reference index, the motion vector, and the motion vector resolution, together with the merge flag as the coded motion information. In this case, the motion information is generated as a differential motion vector by calculating the prediction motion vector from pre-encoded temporal/spatial adjacent motion vectors, and the coded motion information may be configured together with the merge flag.

In the same method as the above-described "unmerged" case, the non-merge motion information generator 230 may generate the coded motion information including the motion information, such as the reference index, the motion vector, and the motion vector resolution, without the merge flag.

As described above with reference to FIGS. 2 to 4, if using the coded motion information generating apparatus 200, the encoding of the merge flag information is reduced according to the characteristic of the image when the encoding is performed by merging the motion information. Therefore, the motion information is efficiently encoded to thereby increase the coding efficiency and improve the compression efficiency.

Figure 5:
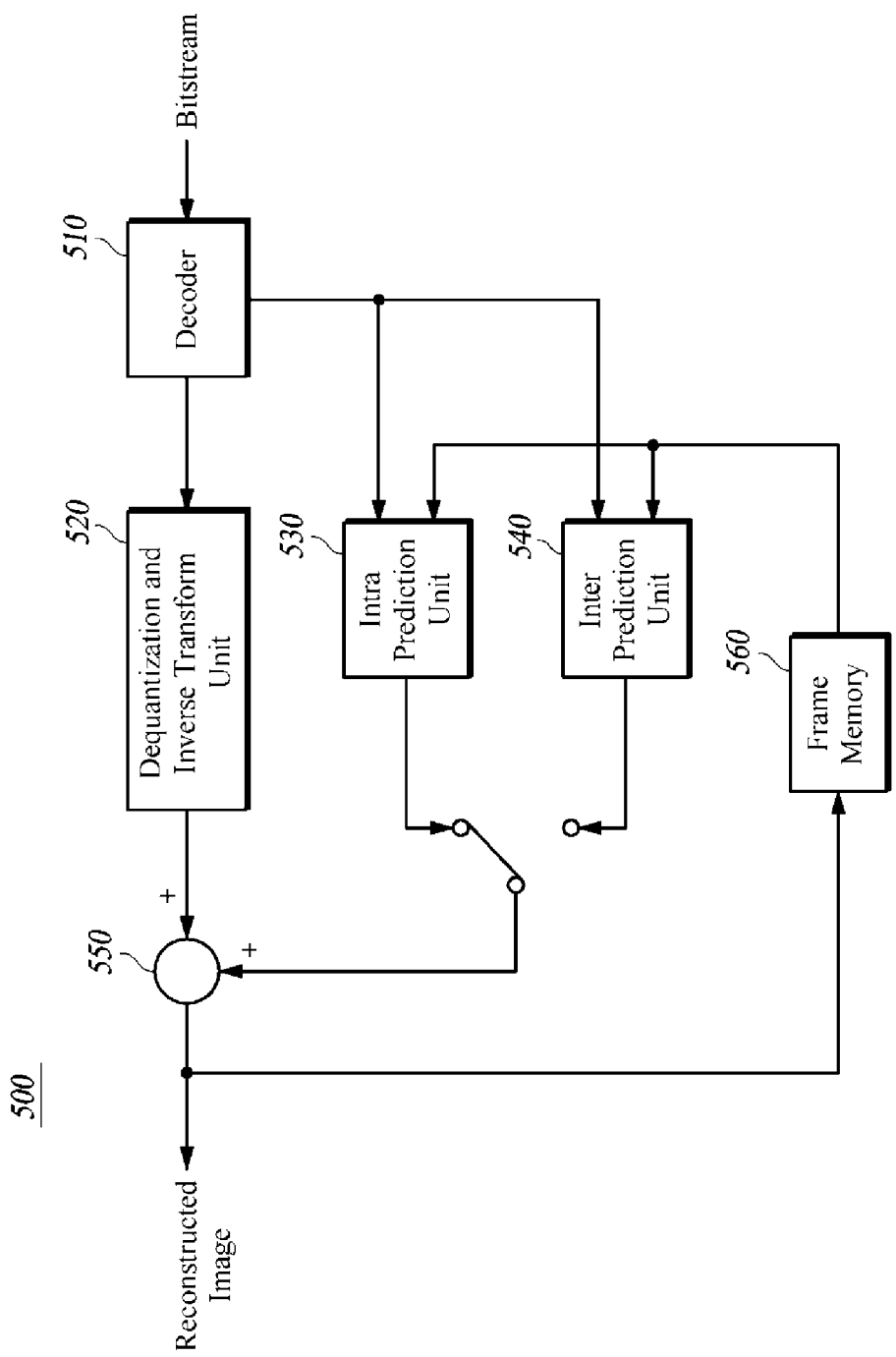
FIG. 5 is a schematic block diagram of a configuration of a video decoding apparatus according to one or more embodiments of the present disclosure.

FIG. 5 is a block diagram schematically showing a configuration of a video decoding apparatus according to one or more embodiments of the present disclosure.

The video decoding apparatus 500 according to at least one embodiment of the present disclosure may include a decoding unit 510, a dequantization and inverse transform unit 520, an intra prediction unit 530, an inter prediction unit 540, an addition unit 550, and a frame memory 560. Other components of the video decoding apparatus 500, such as the decoding unit 510, the dequantization and inverse transform unit 520, the intra prediction unit 530, and the inter prediction unit 540 are implemented by one or more processors and/or application-specific integrated circuits (ASICs).

The decoding unit 510 decodes the encoded data (bitstream) to extract data necessary for block decoding, such as the inter prediction mode, the coded motion information, the intra prediction mode, and texture. That is, the decoding unit 510 extracts the quantization frequency coefficient string by decoding the encoded data, inversely scans the quantization frequency coefficient string in various inverse scanning methods, such as inverse zigzag scanning, and generates the residual block having the quantization frequency coefficients. In this case, the decoding unit 510 may extract the residual block from the first field included in the encoded data, and decode the extracted residual block. The decoding unit 510 may extract information necessary for prediction, such as the intra prediction mode, the inter prediction mode, and the coded motion information, from the second field included in the encoded data. The decoding unit 510 may transfer the extracted information necessary for prediction to the intra prediction unit 530 or the inter prediction unit 540, so that the corresponding prediction unit can predict the current block in the same method as the corresponding prediction unit of the video encoding apparatus 100. The coded motion information to be decoded may include the motion information. In some cases, instead of the motion information, the merge flag and the merge direction flag may be included in the coded motion information, and the motion information and the merge flag may be included in the coded motion information.

The dequantization and inverse transform unit 520 generates the dequantized residual block by dequantizing the quantized residual block, and generates the residual block by inversely transforming the dequantized block.

The intra prediction unit 530 generates the prediction block of the current block by using the information necessary for intra prediction, which is transferred from the decoding unit 510.

Figure 6:
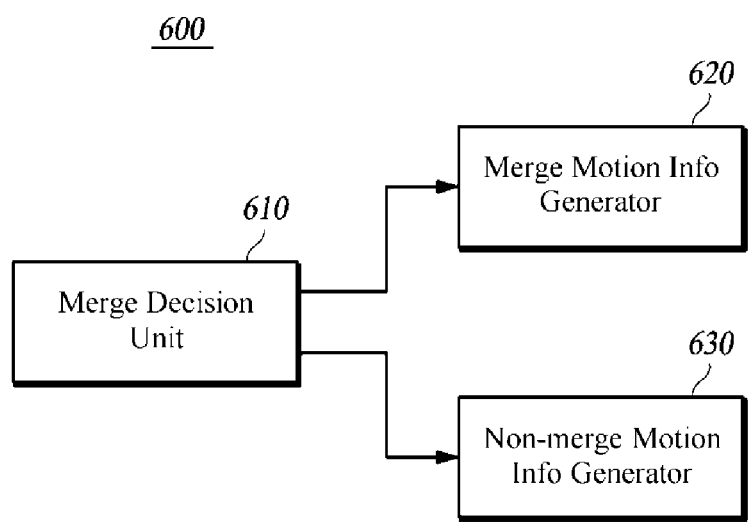
FIG. 6 is a schematic block diagram of a configuration of a motion information reconstructing apparatus according to one or more embodiments of the present disclosure.

The inter prediction unit 540 generates the prediction block of the current block by using the information necessary for inter prediction, which is transferred from the decoding unit 510. At this time, when the inter prediction unit 540 receives the coded motion information from the decoding unit 510 and all pieces of motion information of the merge-decision block composed of the motion information of the neighboring blocks are equal to one another, the motion information of the current block can be reconstructed from the motion information set of the merge candidate blocks composed of the motion information of the neighboring blocks or the motion information included in the coded motion information according to the merge flag included in the coded motion information, and the prediction block of the current block can be generated by using the reconstructed motion information. In addition, in a case where all pieces of motion information of the merge-decision block composed of the motion information of the neighboring blocks are not similar to one another, the inter prediction unit 540 can reconstruct the motion information of the current block by using the motion information included in the coded motion information, and generate the prediction block of the current block by using the reconstructed motion information. The inter prediction unit 540 may include a motion information reconstructing unit (not shown). The motion information reconstructing unit may be implemented by an individual hardware or software mode and may be configured with a motion information reconstructing apparatus 600 as shown in FIG. 6. The operation of the motion information reconstructing apparatus 600 will be described in detail with reference to FIG. 6.

The addition unit 550 reconstructs the current block by adding the prediction block to the residual block. The current block reconstructed by the addition unit 550 may be transferred to the frame memory 560, and may be used to predict other blocks in the prediction unit.

The frame memory 560 stores the reconstructed image and enables the generation of intra and inter prediction blocks.

The inter prediction unit 530 may include a motion information reconstructing unit that receives the coded motion information from the decoding unit 510, decodes (or reconstructs) the motion information, and generates the prediction block by using the decoded motion information. The motion information reconstructing unit may be implemented by an individual hardware or software module and may be configured with the motion information reconstructing apparatus 600 as shown in FIG. 6.

FIG. 6 is a block diagram schematically showing a configuration of the motion information reconstructing apparatus 600 according to one or more embodiments of the present disclosure.

The motion information reconstructing apparatus 600 according to one or more embodiments of the present disclosure includes a merge decision unit 610, a merge motion information decoder 620, and a non-merge motion information decoder 630. Other components of the motion information reconstructing apparatus 600 such as the merge decision unit 610, the merge motion information decoder 620, and the non-merge motion information decoder 630 are implemented by one or more processors and/or application-specific integrated circuits (ASICs). In the identical or similar manner to that used in the video encoding apparatus 100, the merge decision unit 610 decides whether to reconstruct (or decode the motion information by merging according to whether all pieces of motion information of the merge-decision blocks composed of the motion information of the neighboring blocks are similar to one another. In a case where the merge decision unit 610 decides to reconstruct (or decode) the motion information by merging, the merge motion information decoder 620 receives the merge flag included in the coded motion information, and sets one of the pieces of the motion information of the merge candidate blocks as the motion information of the current block when the merge flag represents "merged" and all pieces of the motion information of the merge candidate blocks are equal to one another. When all of the pieces of the motion information of the merge candidate blocks are not equal to one another (that is, when some parts of the pieces of the motion information of the merge candidate blocks are equal to one another), the merge motion information decoder 620 receives the merge direction flag, and sets the motion information of the corresponding block among the merge candidate blocks represented by the merge direction flag as the motion information of the current block. When the merge flag represents "unmerged", the merge motion information decoder 620 receives the motion information included in the coded motion information, and sets the received motion information as the motion information of the current block. In a case where the merge decision unit 610 decides not to reconstruct (or decode) the motion information by merging, the non-merge motion information decoder 630 extracts the motion information of the current block from the coded motion information extracted by the decoding unit 510.

The merge motion information decoder 620 generates the merge candidate set, generates one of the motion information set of the merge candidate blocks as the motion information of the current block to be decoded (or reconstructed), when the merge flag included in the coded motion information represents "merged" and all pieces of the motion information are identical with one another among the motion information sets of the merge candidate blocks composed of the motion information of the merge candidate blocks, and generate the motion information of the neighboring block represented by the merge direction flag as the motion information of the current block among the merge candidate blocks sets by using the merge direction flag included in the coded motion information. In addition, when the merge flag included in the coded motion information represents "unmerged", the merge motion information decoder 620 extracts the motion information of the current block from the motion information included in the coded motion information.

When the merge decision unit 610 decides to directly reconstruct (or decode) the motion information without merging, the non-merge motion information decoder 630 receives the motion information included in the decoded coded-motion information, such as the reference index, the motion vector, and the motion vector resolution, and sets the received motion information as the motion information of the current block.

Figure 7:
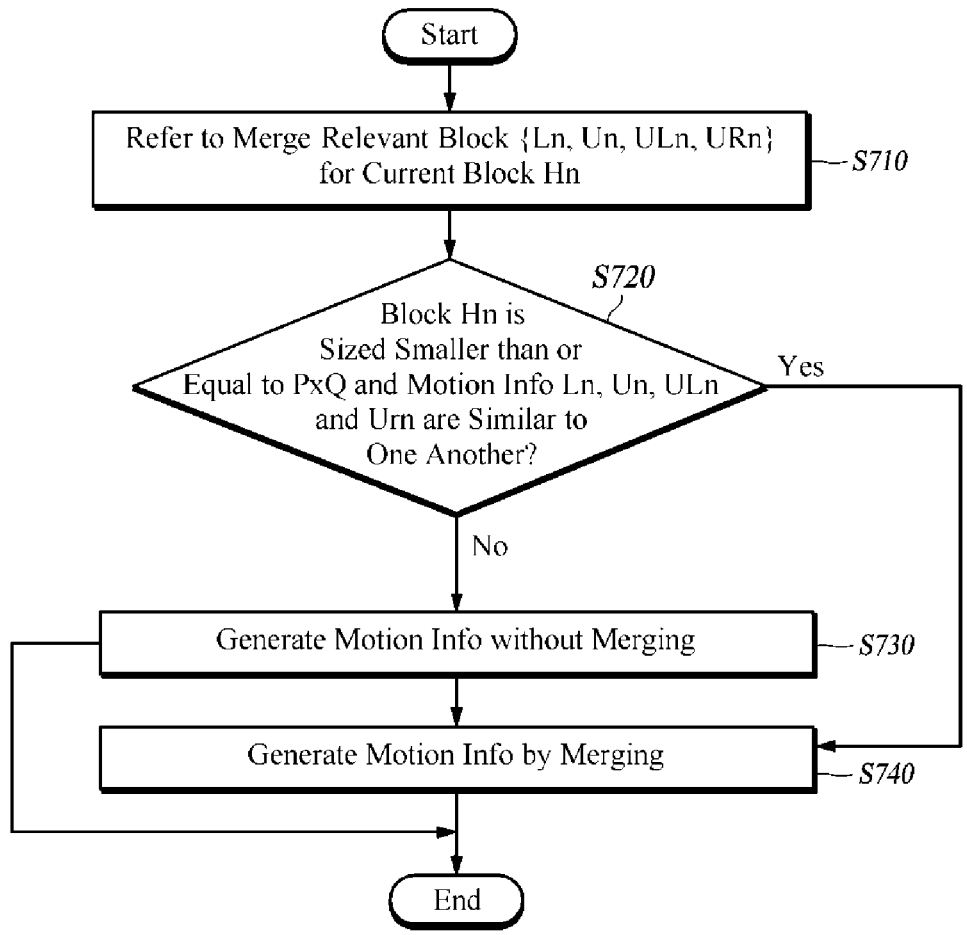
FIG. 7 is an exemplary flowchart of a motion information reconstructing method according to one or more embodiments of the present disclosure.

FIG. 7 is a diagram exemplarily showing a flow diagram of a motion information reconstructing method according to one or more embodiments of the present disclosure.

As shown in FIG. 7, the merge decision unit 610 may refer to motion information of a neighboring block set {Ln, Un, ULn, URn} as a set of motion information of merge-decision blocks for a current block (S710). The neighboring blocks constituting the merge-decision block set may be different from the neighboring blocks constituting the merge candidate block set used for the actual merge. In addition, the merge decision unit 610 may decide whether to encode the motion information by merging, by additionally deciding whether the current block is sized larger than a predetermined size. That is, the merge decision unit 610 determines a condition as to whether the current block Hn is sized smaller than or equal to a predetermined size PXQ (for example, 4×4 or 8×8), or all pieces of the motion information of the neighboring block set {Ln, Un, ULn, URn} are similar to one another (S720). If not satisfying the condition, it is determined that the corresponding area is an area where the motions of the current block and/or the neighboring blocks are very complex, and thus, the coded motion information is generated without merging (S730). If the current block Hn is sized larger than the predetermined size PXQ (for example, 4×4 or 8×8) and all pieces of the motion information of the neighboring block set {Ln, Un, ULn, URn} are similar to one another, the coded motion information is generated by merging (S740). It is determined that the motion information of the neighboring block encoded in the intra mode is different from the motion information of other neighboring blocks. In at least one embodiment, PXQ may be set to 8×8 or 4×4. The determination for similarity or nonsimilarity between the motion vectors contained in the motion information of the merge-decision blocks may be made by determining whether the distances between the motion vectors of the neighboring blocks are smaller than predetermined threshold value information. At this time, the distance between the motion vectors may use a two-dimensional Euclidean distance or a city-block distance. In addition, the determination as to whether the pieces of the motion information are similar to one another may be made by using a part of information among the pieces of the motion information, for example, by using only the motion vector. In addition, the determination as to whether the pieces of the motion information are similar to one another may be made by additionally determining whether the reference frames of the motion information are equal to one another. That is, when the reference frames as well as the motion vectors are equal to one another, it can be determined that the pieces of the motion information are similar to one another.

Meanwhile, the video encoding and decoding apparatus according to one or more embodiments of the present disclosure may be configured by connecting an encoded data (bitstream) output terminal of the video encoding apparatus 100 of FIG. 1 to an encoded data (bitstream) input terminal of the video decoding apparatus 500 of FIG. 5.

The video encoding and decoding apparatus according to one or more embodiments of the present disclosure includes: a video encoder for generating a prediction block of a current block by using motion compensation, deciding whether to encode motion information by merging, based on pre-encoded information, generating coded motion information of the current block according to the decision result, generating a residual block by subtracting the prediction block from the current block, generating a quantized frequency residual block by frequency-transforming (i.e., hereinafter, "frequency-transforming" is referred to as "transforming the residual block with a frequency coefficient," for description convenience) and quantizing the residual block, and generating a bitstream by entropy-encoding the coded motion information and the quantized frequency residual block; and a video decoder for receiving a bitstream, reconstructing coded motion information and a residual block, deciding whether to reconstruct the motion information by merging, based on pre-decoded information, reconstructing motion information of the current block from the coded motion information according to the decision result, and reconstructing the current block by adding the reconstructed residual block to the prediction block generated by using the reconstructed motion information.

The video encoder can be implemented with the video encoding apparatus 100 according to one or more embodiments of the present disclosure, and the video decoder can be implemented with the video decoding apparatus 500 according to one or more embodiments. The below described steps S810~S840 and S910~S940 are not shown.

A video encoding method according to one or more embodiments of the present disclosure includes an inter prediction step (S810) of generating a prediction block of a current block by using motion compensation, deciding whether to encode motion information by merging, based on pre-encoded information, and generating coded motion information of the current block according to the determination result, a subtraction step (S820) of generating a residual block by subtracting the prediction block from the current block, a transform and quantization step (S830) of generating a quantized frequency residual block by frequency-transforming and quantizing the residual block, and an encoding step (S840) of generating a bitstream by entropy-encoding the coded motion information and the quantized frequency residual block.

Since the prediction step (S810), the subtraction step (S820), the transform and quantization step (S830), and the encoding step (S840) correspond to the operations of the prediction unit 120, the subtraction unit 130, the transform and quantization unit 140, and the encoding unit 150, respectively, detailed description thereof will be omitted.

A video decoding method according to one or more embodiments of the present disclosure includes a decoding step (S910) of receiving encoded data, extracting coded motion information and quantization coefficient string, and reconstructing a quantized frequency residual block, a dequantization and inverse transform step (S920) of reconstructing the residual block by dequantizing and inversely transforming the quantized frequency residual block, an inter prediction step (S930) of deciding whether to reconstruct (or decode) motion information by merging, based on pre-decoded information, reconstructing motion information of a current block from the coded motion information according to the decision result, and generating a prediction block of the current block by using the reconstructed motion information, and an addition step (S940) of reconstructing the current block by adding the prediction block to the reconstructed residual block.

Since the decoding step (S910), the dequantization and inverse transform step (S920), the inter prediction step S(930), and the addition step S(940) correspond to the operations of the decoding unit 510, the dequantization and inverse transform unit 520, the inter prediction unit 840, and the addition unit 550, respectively, detailed description thereof will be omitted.

A coded motion information generating method according to one or more embodiments of the present disclosure includes a merge decision step (S1010) of deciding whether to encode coded-motion information by merging according to whether all pieces of the motion information of merge-decision blocks composed of motion information of neighboring blocks are similar to one another, a merge motion information generation step (S1020) of generating the coded motion information by merging according to whether the motion information of the current block is identical with the motion information of the merge candidate blocks composed of the motion information of the neighboring blocks when it is decided to encode the motion information, and a non-merge motion information generation step (S1030) of generating the coded motion information without merging when it is decided not to encode the motion information by merging.

Since the merge decision step (S1010), the merge motion information generation step (S1020), and the non-merge motion information generation step (S1030) correspond to the operations of the merge decision unit 210, the merge motion information generator 220, and the non-merge motion information generator 230, detailed description thereof will be omitted.

A motion information decoding method according to one or more embodiments of the present disclosure includes a merge decision step (S1110) of deciding whether to reconstruct (or decode) motion information by merging according to whether all pieces of merge-decision block motion information composed of motion information of neighboring blocks, a merge motion information decoding step (S1120) of, in a case where it is decided to reconstruct (or decode) the motion information by merging in the merge decision step, receiving a merge flag included in the coded motion information, and setting one of the pieces of the motion information of the merge candidate blocks as the motion information of the current block when the merge flag represents "merged" and all pieces of the motion information of the merge candidate blocks are equal to one another, receiving the merge direction flag when all of the pieces of the motion information of the merge candidate blocks are not equal to one another, and setting the motion information of the block represented by the merge direction flag as the motion information of the current block, receiving the motion information included in the coded motion information when the merge flag represents "unmerged", and setting the received motion information as the motion information of the current block, and a non-merge motion information decoding step (S1130) of, in a case where it is decided not to reconstruct (or decode) the motion information by merging in the merge decision step, extracting the motion information of the current block from the coded motion information.

Since the merge decision step (S1110), the merge motion information decoding step (S1120), and the non-merge motion information decoding step (S1130) correspond to the operations of the merge decision unit 610, the merge motion information decoder 620, and the non-merge motion information decoder 630, detailed description thereof will be omitted. The below described steps S1010-S1130 are not shown.

The video encoding and decoding method according to one or more embodiments of the present disclosure may be realized by a combination of the video encoding method according to one or more embodiments of the present disclosure and the video decoding method according to one or more embodiments of the present disclosure.

The video encoding and decoding method according to one or more embodiments of the present disclosure includes a video encoding step of generating a prediction block of a current block by using motion compensation, deciding whether to encode motion information by merging, based on pre-encoded information, generating coded motion information of the current block according to the decision resulted, generating a residual block by subtracting the prediction block from the current block, generating a quantized frequency residual block by frequency-transforming and quantizing the residual block, and generating a bitstream by entropy-encoding the coded motion information and the quantized frequency residual block. The video encoding/decoding method further includes a video decoding step of receiving a bitstream, reconstructing coded motion information and a residual block, determining whether to reconstruct the motion information by merging, based on pre-decoded information, reconstructing motion information of the current block from the coded motion information according to the determination resulted, and reconstructing the current block by adding the reconstructed residual block to the prediction block generated by using the reconstructed motion information.

The video encoding step can be realized by the video encoding method according to one or more embodiments of the present disclosure, and the video decoding step can be realized by the video decoding method according to one or more embodiments.

According to the present disclosure as described above, when performing encoding by merging motion information, whether to encode motion information is decided, based on pre-encoded information. Therefore, the amount of merge-related data is reduced, thereby efficiently encoding the motion information and improving video compression efficiency. As a result, the video compression efficiency is improved, and encoded data is efficiently reconstructed.

In addition, when performing encoding by merging motion information, the size of a block to be encoded is checked, and the block is encoded without merging when a corresponding image is determined as a complex area. The block to be encoded is selectively merged according to image characteristics. This reduces the amount of relevant merge flag information to effect reconstructing the smaller transmission of the encoded data.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents.

Some embodiments as described above may be implemented in the form of one or more program commands that can be read and executed by a variety of computer systems and be recorded in any non-transitory, computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from the various characteristics of the disclosure. That is, it is understood that the present disclosure should not be limited to these embodiments but various changes and modifications can be made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have not been described for limiting purposes. Accordingly, the scope of the claimed invention is not to be limited by the above embodiments but by the claims and the equivalents thereof.

What is claimed is:

1. An apparatus for decoding a current block in a current frame by using an inter prediction, the apparatus comprising:

a decoding unit configured to
extract a first identification information from a bitstream, wherein the first identification information indicates whether motion information of the current block is set as one of a plurality of motion information candidates, wherein the motion information includes a motion vector of the current block and a reference frame index of the current block, and
reconstruct a quantized frequency residual block of the current block from the bitstream;

a dequantization and inverse transform unit configured to dequantize and inversely transform the quantized frequency residual block to reconstruct a residual block of the current block;

an inter prediction unit configured to perform the inter prediction by, when the first identification information indicates that the motion information of the current block is set as one of the plurality of motion information candidates,
generating the plurality of motion information candidates of the current block from neighboring blocks of the current block, wherein the neighboring blocks are adjacent to the current block and are located in the current frame,
selecting a motion information candidate from the plurality of motion information candidates based on a second identification information, the second identification information being decoded from the bitstream,
reconstructing the motion information of the current block as the selected motion information candidate, and
generating an inter-predicted block of the current block by using the reconstructed motion information of the current block; and an addition unit configured to add the inter-predicted block to the residual block so as to reconstruct the current block, wherein when the first identification information doesn't indicate that the motion information of the current block is set as one of the plurality of motion information candidates, the inter prediction unit is configured to perform the inter prediction by generating the inter-predicted block of the current block by using a decoded motion information of the current block, wherein the decoded motion information of the current block has been extracted from the bitstream and decoded, wherein the plurality of motion-information candidates are generated by using motion information items of the neighboring blocks of the current block, wherein the motion information items include each motion vector of each of the neighboring blocks and each reference frame index of said each of the neighboring blocks, and wherein the neighboring blocks include a neighboring block including a sample located just above a left sample of a top-left sample of the current block, and a neighboring block including a sample located on a right side just above a top-right sample of the current block.

* * * * *